(12) United States Patent
Nick et al.

US007753164B2

(10) Patent No.: US 7,753,164 B2
(45) Date of Patent: Jul. 13, 2010

(54) MEMBRANES MADE OF CAST POLYARYLATE FILM

(75) Inventors: Jürgen Nick, Neuenburg (DE); Ulrich Siemann, Weil am Rhein (DE)

(73) Assignee: LOFO High Tech Film GmbH, Weil am Rhein (DE)

( * ) Notice: Subject to any disclaimer, the term of this patent is extended or adjusted under 35 U.S.C. 154(b) by 1378 days.

(21) Appl. No.: 10/516,589

(22) PCT Filed: Jun. 30, 2003

(86) PCT No.: PCT/EP03/06905

§ 371 (c)(1),
(2), (4) Date: Apr. 29, 2005

(87) PCT Pub. No.: WO2004/003062

PCT Pub. Date: Jan. 8, 2004

(65) Prior Publication Data
US 2005/0221106 A1 Oct. 6, 2005

(30) Foreign Application Priority Data
Jun. 28, 2002 (EP) ................................ 02014418

(51) Int. Cl.
*C08G 63/00* (2006.01)
*G10K 13/00* (2006.01)
*H04R 7/00* (2006.01)
(52) U.S. Cl. ...................... 181/167; 528/176
(58) Field of Classification Search ............. 528/125, 528/176; 181/167
See application file for complete search history.

(56) References Cited

U.S. PATENT DOCUMENTS

| 4,173,701 | A | * | 11/1979 | Murata et al. ............... 528/194 |
| 4,281,223 | A | * | 7/1981 | Ugaji et al. ................. 381/408 |
| 4,380,598 | A | * | 4/1983 | Robeson et al. ............ 524/163 |
| 4,556,530 | A | * | 12/1985 | van der Scheer et al. .... 264/298 |
| 4,564,541 | A | * | 1/1986 | Taira et al. ................. 428/35.4 |
| 4,612,350 | A | * | 9/1986 | Parker ......................... 525/177 |
| 4,654,411 | A | * | 3/1987 | Serini et al. ................. 528/176 |
| 4,746,472 | A |   | 5/1988 | Kohn |
| 4,847,351 | A | * | 7/1989 | Schissel et al. ............. 528/193 |
| 4,908,419 | A | * | 3/1990 | Holub et al. ................. 525/425 |
| 4,910,083 | A | * | 3/1990 | Kohn ........................... 428/333 |
| 4,992,526 | A | * | 2/1991 | Wang ........................... 528/179 |
| 5,035,970 | A | * | 7/1991 | Hsieh et al. ............... 430/110.2 |
| 5,053,481 | A | * | 10/1991 | Ishii et al. ................... 528/206 |
| 5,082,919 | A | * | 1/1992 | Sacripante et al. .......... 528/176 |
| 5,108,530 | A |   | 4/1992 | Niebling, Jr. et al. |
| 5,159,028 | A | * | 10/1992 | Matzner et al. ............. 525/394 |
| 5,275,881 | A |   | 1/1994 | Ikeda et al. |
| 6,117,370 | A |   | 9/2000 | Hasegawa et al. |
| 6,372,877 | B1 | * | 4/2002 | Cassidy et al. .............. 528/125 |
| 6,378,649 | B1 | * | 4/2002 | Inoue et al. ................. 181/167 |
| 6,476,158 | B1 | * | 11/2002 | England et al. .............. 525/466 |
| 6,593,000 | B2 | * | 7/2003 | Ohtake et al. ............... 428/447 |
| 6,852,308 | B2 | * | 2/2005 | Kohn et al. .................. 424/9.6 |
| 7,092,544 | B2 | * | 8/2006 | Hachiya et al. ............. 381/426 |
| 7,271,234 | B2 | * | 9/2007 | Kohn et al. .................. 528/196 |
| 2001/0019182 | A1 | * | 9/2001 | Hebrink et al. ............. 264/1.6 |
| 2001/0033215 | A1 | * | 10/2001 | Sakai .......................... 335/252 |
| 2001/0052385 | A1 | * | 12/2001 | Enlow et al. ........... 156/244.11 |
| 2003/0024881 | A1 | * | 2/2003 | Kalthod ...................... 210/649 |
| 2003/0054158 | A1 | * | 3/2003 | Smith et al. ................. 428/323 |
| 2003/0114588 | A1 | * | 6/2003 | Nakamura et al. ............. 525/70 |
| 2003/0149190 | A1 | * | 8/2003 | Duan et al. .................. 525/439 |
| 2003/0171494 | A1 | * | 9/2003 | Aramaki et al. ............. 525/242 |
| 2003/0181560 | A1 | * | 9/2003 | Kawaguchi et al. ......... 524/424 |
| 2003/0207123 | A1 | * | 11/2003 | Brunelle et al. ........... 428/423.7 |
| 2004/0037778 | A1 | * | 2/2004 | Kohn et al. ............... 424/9.451 |
| 2004/0043234 | A1 | * | 3/2004 | Hay et al. .................... 428/496 |
| 2004/0091667 | A1 | * | 5/2004 | Bermel ........................ 428/141 |
| 2004/0142257 | A1 | * | 7/2004 | Ioannidis ...................... 430/56 |

FOREIGN PATENT DOCUMENTS

EP          0371425          6/1990

(Continued)

OTHER PUBLICATIONS

Patent Abstracts of Japan, vol. 18, No. 313 (C-1212), Jun. 15, 1988, (Abstract C-1212).

(Continued)

*Primary Examiner*—Mark Eashoo
*Assistant Examiner*—Liam J Heincer
(74) *Attorney, Agent, or Firm*—Fisher, Christen & Sabol

(57) ABSTRACT

Thermoformed diaphragms made of cast polyarylate films, at least comprising one polyarylate (PAR) having a structural unit of the formula (I):

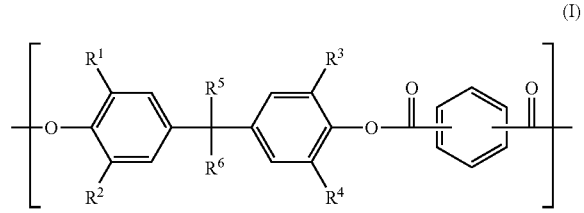

(I)

where each of $R^1$, $R^2$, $R^3$, and $R^4$, independently of the others, is hydrogen, $C_{1-4}$-alkyl, $C_{1-4}$-alkoxy, or halogen, and each of $R^5$ and $R^6$ independently of the other, is hydrogen, $C_{1-4}$-alkyl, $C_{1-4}$-alkoxy, phenyl, or halogen. The thermoformed diaphragms made of cast PAR films can be used as acoustic transducers, preferably as microphone diaphragms or loudspeaker diaphragms. The cast PAR films can be used for producing these diaphragms, and the PAR casting solutions can be used for producing the cast PAR films. There are processes for producing thermoformed diaphragms made of cast PAR films.

15 Claims, No Drawings

FOREIGN PATENT DOCUMENTS

| | | |
|---|---|---|
| EP | 0488221 | 6/1992 |
| EP | 1001282 | 5/2000 |
| JP | 60219899 A * | 11/1985 |
| JP | 08-122526 | 5/1996 |
| JP | 08-134336 | 5/1996 |
| JP | 08-269214 | 10/1996 |

OTHER PUBLICATIONS

W. Weibull, Ing. Vetenskaps Akad. Handl., vol. 151 (1939) pp. 1 to 45.

* cited by examiner

MEMBRANES MADE OF CAST POLYARYLATE FILM

This is a 371 national stage application of PCT/EP2003/006905, filed on Jun. 30, 2003, that has benefit of German Patent Application No. 02014418.4, filed on Jun. 28, 2002.

The invention relates to diaphragms made of cast polyarylate films (cast PAR films), and in particular to their use as thermoformed microphone diaphragms or thermoformed loudspeaker diaphragms, and also to the corresponding cast PAR films, casting solutions for producing the cast PAR films, a process for producing thermoformed microphone diaphragms or thermoformed loudspeaker diaphragms, and a process for producing the PAR films.

Polymer films, inter alia composed of polycarbonates (PC), of polyesters (PET, PEN), of polyether sulfones (PES), and of polyetherimides (PEI) have hitherto been used for producing small diaphragms with a diameter of up to about 10 cm for acoustic applications (signal transducers) for use in mobile devices, such as microphones, mobile telephones, laptops, personal digital assistants (PDAs), or headphones, or as signal generators, e.g. in the automotive industry. In order to reduce the vibrating mass of the diaphragms, and to ensure precise reproduction of embossed structures during thermoforming, and to permit further miniaturization, the intention is that the films have minimum thickness. Films composed of the plastics mentioned have high mechanical strength, but have the disadvantage of generating a "metallic" sound when used as loudspeaker diaphragms, or of inadequate capability for deforming to reproduce relatively complicated embossed structures. Consequently, music signals and/or speech signals are altered disadvantageously on conversion into electrical signals and vice versa.

Small microphone diaphragms and small loudspeaker diaphragms are generally produced in the application sectors mentioned by the thermoforming process. This process heats the film for softening prior to the thermoforming, for example through irradiation with infrared light (IR). The more anisotropic the film, the more difficult the control needed in industry for uniform heating and resultant uniform softening of particularly thin films prior to the thermoforming. Cast films are markedly more isotropic than stretched and/or extruded films. Films composed of extruded PC, polyethylene naphthalate (PEN), or polyethylene terephthalate (PET) tend to be deform to a greater or lesser extent and/or to shrink, because some of the internal stress built up during the extrusion/stretching process is released during the heating process. Thin cast films have fewer internal stresses than extruded/stretched films and can be thermoformed more uniformly, and are particularly suitable for the application sectors mentioned. However, especially in the case of PET and PEN, the poor solubility of these polymers prevents the production of cast films.

It was an object of the invention to provide films for the production of diaphragms for acoustic applications. These diaphragms are moreover intended to permit good intelligibility of speech and high-quality reproduction of music at adequate volume, and to have high mechanical stability a high temperature.

The high quality requirements, particularly applying to small diaphragms for acoustic applications, mean that even very thin films should permit uniform heating by IR and problem-free thermoforming.

In past years, diaphragms based on films have mainly been produced from extruded films. Only in the production of high-quality loudspeaker diaphragms has use also been made of cast films composed of polycarbonates.

Surprisingly, it has now been found that diaphragms made of cast PAR films have markedly better acoustic properties than diaphragms made, by way of example, of extruded PC films, of extruded PEN films, or of extruded PEI films. There are also marked advantages over cast PC films.

Cast PAR films are known to have very good properties of optical isotropy and high heat resistance, and have hitherto been used exclusively for optical applications (EP-A-0488221, JP-A-08/122526, JP-A-08/134336, and JP-A-08/269214).

When the strengths of many materials are determined, the measured values can be found to have a high degree of scatter, deriving from defects which are present in the material and whose distribution is a function of the production process. A reliable conclusion concerning the strength of a material, and therefore also relating to the distribution of defects within this material, requires knowledge not only of the average of the tensile stresses measured (maximum tensile stress, tensile stress at break), but also of the statistical distribution of the strength values. A proven statistical method is based on the extreme-value-distribution method of W. Weibull (Ing. Vetenskaps Akad. Handl., 151 (1939) 1-45), which calculates the probability that a specimen of given geometry will fail under a tensile stress $\sigma$. The two relevant tensile stress values, the maximum tensile stress, i.e. the tensile stress at which a steep fall-off in tensile stress begins, and therefore at which a steep fall-off in strength begins, and the tensile stress at break, i.e. the final tensile stress value measured prior to the complete separation of the material, correlate directly with the final failure of the material.

The improvement in the properties of maximum tensile stress and ultimate tensile strength of the inventive cast PAR film material, in comparison with cast PC films (PC-A and PC-B) composed of two different grades of polycarbonates could be demonstrated (see example 12) by studying 40 specimens of each.

It has also been found that cast PAR films have a high damping factor and have substantially linear acoustic properties over a wide range of frequencies and of volumes, and can therefore be utilized for acoustic applications. Diaphragms made of cast PAR films have excellent properties in relation to the initiation and attenuation of vibration, and uniform vibration behavior over a wide range of frequencies and of volumes, and permit good intelligibility of speech.

It has been found that colored cast PAR films can be very uniformly heated and thermoformed, and are therefore particularly well suited to the production of small diaphragms.

It has also been found that the addition of certain dyes or of nonionic surfactants has a favorable effect on undesirable thixotropic properties of the PAR casting solutions. The result is that the technical measures prior to and during the casting procedure can be simplified considerably, and the entirety of the casting process can be decisively improved.

Finished molded diaphragms made of PAR have increased heat resistance ($T_g=188°$ C.) when compared with those made of PC ($T_g=135°$ C.). The lower tendency toward shrinkage and dimensional stability at high temperature of diaphragms made of cast PAR films makes them superior to diaphragms made of extruded PC films, of extruded PEI films, of extruded PEN films, of extruded PES films, or of extruded PET films. When comparison is made with extruded and stretched films, for example PC films, PEI films, or PEN films, diaphragms with more complicated geometries can be produced from PAR films.

Because they are highly isotropic, cast PAR films are preferably used in the form of unstretched films for diaphragm production. However, the inventive cast PAR films may, where appropriate, be mono- or biaxially stretched prior to diaphragm production.

Diaphragms produced from PAR moreover have low flammability, even without additives which may affect vibration performance.

It has also been found that diaphragms made of PAR films have increased moisture resistance.

According to the invention thermoformed diaphragms for acoustic applications are produced from cast PAR films which comprise at least one polyarylate having a structural unit of the formula:

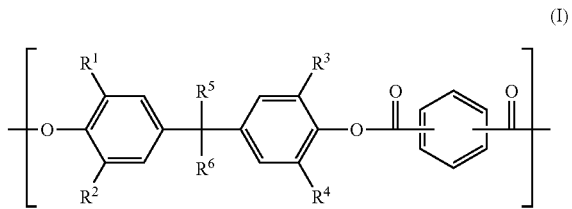

(I)

where each of $R^1$, $R^2$, $R^3$, and $R^4$, independently of the others, is hydrogen, $C_{1-4}$-alkyl, $C_{1-4}$-alkoxy, or halogen, and each of $R^5$ and $R^6$, independently of the other, is hydrogen, $C_{1-4}$-alkyl, $C_{1-4}$-alkoxy, phenyl, or halogen.

In one preferred embodiment, $R^1=R^2$ and $R^3=R^4$ and each, independently of the others, is hydrogen or $C_{1-4}$-alkyl.

In a particularly preferred embodiment, $R^1=R^2=R^3=R^4$ and are each hydrogen or $C_{1-4}$-alkyl.

In another preferred embodiment each of, $R^5$ and $R^6$, independently of the other, is $C_{1-4}$-alkyl. In one particularly preferred embodiment, $R_5=R_6=$methyl.

By way of example, polyarylate where $R^1=R^2=R^3=R^4=$hydrogen and $R^5=R^6=$methyl and where the molecular weight is in the range from 10 000 to 150 000 may be purchased from UNITIKA CHEMICAL K.K., 3-11, Chikkoshin-machi, Sakai-shi, Osaka 592, Japan with the name "U-Polymer 100".

The inventive diaphragms may have a thickness of from 5 to 200 μm, preferably from 5 to 100 μm, and particularly preferably from 10 to 50 μm.

According to the invention, the excellent damping properties (internal loss) of PAR films makes them particularly well suited to the production of thermoformed diaphragms as acoustic transducers for acoustic applications, preferably as microphone diaphragms and/or loudspeaker diaphragms. When compared with known diaphragms composed of other polymers, they have less "metallic" sound characteristics.

The mechanical strength of the inventive PAR diaphragms is markedly better than that of PC diaphragms, and gives a longer lifetime when electrically driven, using the same nominal power rating, at an elevated temperature.

The inventive thermoformed PAR diaphragms are particularly suitable when requirements for intelligibility of speech are high, for example in use as diaphragms for the microphones or loudspeakers in microphone capsules, in mobile telephones, in hands-free systems, in radiosets, in hearing devices, in headphones, in microradios, in computers, and in PDAs. Another application sector is the use as a signal generator.

All of the % data below for amounts of dyes and surfactants are percentages by weight, based on the solids content in the PAR casting solutions and/or of cast PAR films produced therefrom.

All of the % data below for amounts of polyarylate are percentages by weight, based on the total weight.

For the production of inventive diaphragms made of cast PAR films, for example by means of thermoforming, the films are irradiated with infrared light (IR) to improved deformability, and are heated thereby. The addition of a dye has proven advantageous here, because this achieves uniform heat absorption and softening. The result is that the inventive cast PAR films can be processed more effectively, and the quality of the diaphragms produced therefrom is improved.

Amounts as small as 0.01% of a commercially available dye, such as, "C.I. Solvent Yellow 93" or "C.I. Solvent Orange 107"® are sufficient for uniform heating of inventive cast PAR films. The amount of dye may be still further reduced is use made of pure pigments without auxiliaries and/or fillers.

By way of example, the dye "C.I. Solvent Yellow 93" is obtainable from BAYER, Germany with the trade name Transparent Yellow 3G", from KUNSHAN FAR EAST CHEMICAL COMPANY Ltd., South of Bingxi Town, Kunshan, Jiangsu 215334, PR China, from CHINA CHEMICALS, Luxun Mansion 12 Fl./Suite G, 568 OuYang Road, Shanghai 200081, PR China, and also from HONGMENT CHEMICALS LIMITED, Xinzhuhuayuan 32-203, Ningxi Road, Zhuhai, PR China.

A dye equivalent to "C.I. Solvent Yellow 93", "BASF Thermoplast Yellow 104", is obtainable from BASF, Germany, or with the same "C.I. Solvent Yellow 16" from ZHUHAI SKY-HIGH CHEMICALS CO., Ltd., 20/F, Everbright International Trade Centre, Zhuhai City, Guangdong Province, PR China.

By way of example, "C.I. Solvent Orange 107"® may be purchased from BAYER, Germany.

The currently obtainable commercial forms of the dyes mentioned comprise, inter alia, nonionic polyol surfactants, the advantageous effects of which on inventive PAR casting solutions are described at a later stage below.

Inventive PAR casting solutions and/or cast PAR films produced therefrom comprise at least one of the dyes mentioned and/or one non-ionic polyol surfactant.

Nonionic polyol surfactants are generally nonionic water-soluble polyoxyalkylenes, such as poly(ethylene oxide) or poly(ethylene glycol) (PEO), poly(propylene oxide), or poly(propylene glycol) (PPO), or poly(tetramethylene oxide) (PTMO), having the structural unit —$[(CH_2)_x$—$CHR$-$O]$— as a common feature, where (i) R may be H, x may be 1 (poly(ethylene glycol), (PEO)); (ii) R may be $CH_3$, X may be 1 (poly(propylene glycol), (PPO)); or (iii) R may be H, x may be 3 (poly(tetramethylene oxide), (PTMO)). Polyol surfactants are not only PEO homopolymers, PPO homopolymers, and PTMO homopolymers, but also copolymers of these, in particular block copolymers, and/or polymer mixtures thereof, with an average molecular weight below 20 000.

An example of commercially available poly(ethylene glycol)-poly(propylene glycol) block copolymers is "Pluronic® PE 6800" from BASF or "Synperonic® F86 pract." from SERVA.

Casting solutions composed of PAR of the formula (I) in methylene chloride, where each of $R^1$, $R^2$, $R^3$, and $R^4$, independently of the others, is hydrogen, $C_{1-4}$-alkyl, $C_{1-4}$-alkoxy, or halogen, and where each of $R_5$ and $R_6$, independently of the other, is hydrogen, $C_{1-4}$-alkyl, $C_{1-4}$-alkoxy, phenyl, or halogen, are highly thixotropic, and cannot be stored in the form of ready-to-use solutions without motion. In order to prevent the casting solutions from solidifying in the manner of a gel in the storage containers, in the conveying system, in the filters, or in the casting apparatus, it is necessary to take comprehensive precautions to ensure continuous motion and to avoid "dead spots".

Surprisingly, it has been found that a dye such as "C.I. Solvent Yellow 93", "Solvent Yellow 202", or "Macrolex® Orange R" acts as an agent with anti-thixotropic properties when added to the PAR casting solutions.

Further tests have shown that nonionic polyol surfactants, such as poly(ethylene glycol)-poly (propylene glycol) block copolymers, also bring about this effect when used alone. PAR casting solutions to which one of the nonionic polyol surfactants and/or dyes mentioned is added lose their thixotropic properties. This considerably simplifies the casting process, and the inventive ready-to-use PAR casting solutions can stored for some weeks. In contrast, PAR casting solutions with no addition of surfactant and/or of colorant loose their usefulness completely after as little as a few hours if stored without motion (see example 11).

The nonionic polyol surfactants and dyes mentioned may comprise other additives, such as $TiO_2$.

Inventive PAR casting solutions and/or cast PAR films produced therefrom comprise a dye and/or a non-ionic polyol surfactant.

In one particular embodiment, inventive PAR casting solutions and/or cast PAR films produced therefrom comprise at least one nonionic surfactant, selected from the group consisting of poly(ethylene glycol) poly(propylene glycol), and poly(tetramethylene oxide), where the surfactants mentioned may be used in the form of homopolymers, copolymers, or block copolymers, individually or in the form of a mixture.

In one particularly preferred embodiment, inventive PAR casting solutions and/or cast PAR films produced therefrom comprise at least one polyethylene-polypropylene block copolymer with an average molecular weight of from 6 000 to 10 000.

In one particularly preferred embodiment, inventive PAR casting solutions and/or cast PAR films produced therefrom comprise a dye, such as "C.I. Solvent Yellow 93", "Solvent Yellow 202", or "Macrolex® Orange R", and/or comprise a nonionic polyol surfactant, such as "Pluronic® PE 6 800" or "Synperonic® F86 pract.".

Inventive PAR casting solutions and/or cast PAR films produced therefrom comprise PAR of the formula (I) as claimed in claim 1, and also comprise a dye and/or a nonionic polyol surfactant in an amount of from 0.001 to 2%, preferably in an amount of from 0.001 to 0.15%.

The dye and/or the non-ionic polyol surfactant may be dissolved, by way of example, in acetone, butyl acetate, or methylene chloride, particularly preferably in methylene chloride.

In one preferred embodiment, the dye, such as "C.I. Solvent Yellow 93", "Solvent Yellow 202", or "Macrolex® Orange R" itself comprises a nonionic polyol surfactant, such as "Pluronic® PE 6 800" or "Synperonic® F86 pract.", and may be dissolved in the from of a mixture therewith.

The form in which the dye and/or the non-ionic polyol surfactant is metered into the PAR casting solution until the desired amount has been reached is preferably that of a solution in methylene chloride.

In another preferred embodiment, the dye and/or the non-ionic polyol surfactant is pre-dissolved in the methylene chloride used as solvent for the preparation of the PAR casting solution.

Suitable concentrations for the inventive PAR casting solutions in methylene chloride extend from 10% to the limit of solubility. They are preferably in the range from 15 to 25%, particularly preferably in the range from 20 to 24%.

In one method of producing the diaphragms, the heated and softened PAR films are deformed by means of thermoforming in a thermoforming mold. By way of example, this may be achieved by applying air pressure or a vacuum, or using a mechanical ram. The thermo-forming processes may also be used in combination with one another.

The preferred method for the heating procedure is irradiation with infrared light.

The finished molded diaphragms may then be cut out from the film by means of a mechanical process, for example using a knife or a stamp, or by a contactless method, for example with the aid of a water jet or of a laser. The molded diaphragms are preferably stamped out or laser-cut.

The outer periphery of the diaphragms may then be bonded to a support ring composed of plastic or metal and to a coil with connecting contacts, and installed as a microphone diaphragm or loudspeaker diaphragm together with a permanent magnet into appropriate apparatus acting as a transducer or generator of acoustic signals.

To produce cast polyarylate films, the inventive polyarylate casting solutions are applied by means of a suitable casting device to a substrate, peeled away from this substrate after a period of predrying, and then dried fully.

In one particular embodiment, the cast film is applied by means of a suitable casting device or doctor blade to a glass substrate, predried, peeled away, and finally dried to the desired residual solvent concentration.

In another preferred embodiment, the cast film is applied by means of a suitable casting device to a continuous substrate, predried, peeled away, and finally dried to the desired residual solvent concentration.

In another preferred embodiment, the continuous substrate is a steel belt which is matt or polished on one side and has a length of from 20 to 100 m, or a polished or matt stainless steel roll of circumference from 5 to 25 m.

Particularly in the case of very thin films with film thicknesses <20 μm, it can be advantageous, for increasing the stability of the inventive cast films and for avoiding strain due to tensile stress during the further processing of these films, not to apply the cast film directly to one of the substrates mentioned, but to apply it to an intermediate film which is conducted on the actual substrate. After the predrying period described, this intermediate film may then be peeled away together with the cast film from the actual substrate, and the cast film may be subjected to final drying as described. It is of little importance here whether and when the inventive cast film is separated from the intermediate film. The intermediate film is preferably wound onto rolls together with the inventive cast film and then further processed.

In one preferred embodiment, the intermediate film used comprises a polymer film, particularly preferably a PET film.

In one preferred embodiment, the predrying process preceding the peeling-away of the preformed film takes place directly through infrared irradiation or microwave irradiation, or electrical heating, or indirectly through contact with hot air.

In one preferred embodiment, the solvent content of the PAR film after peeling-away is from 5 to 15%. In another preferred embodiment, the final drying to the desired residual solvent concentration takes place in a heatable drying cabinet through direct and/or indirect heating. The material is particularly preferably unsupported during final drying.

The method of heating may be direct, through infrared and/or microwave heating, and/or indirect, through contact with air at a controlled temperature.

In one preferred embodiment, the PAR film is transported at a speed of from 1 to 20 m/min, preferably from 2 to 5 m/min. During this process, the final drying may be carried out at a temperature in the range from 50 to 200° C. The average thickness of the inventive PAR film after the final drying process is from 5 to 200 μm, its solvent content being below 1.5%.

The properties of the inventive cast PAR films may be still further optimized through coatings. By way of example, these coatings may be applied from a solution or take the form of a laminated-on film or laminated-on layer. In another embodiment, these coatings may also be achieved by extrusion coating, because the PAR film has high heat resistance. By way of example, the coating may further improve the damping properties.

Examples of methods of solution coating are roller application, doctor-blade application, or spray application. Examples of suitable solutions for solution coating are solutions of polyurethanes (PUs) or of acrylates in suitable solvents. Films composed of PE, PP or PU are suitable for lamination-coating. For lamination, use may be made of unstretched or mono- or biaxially stretched cast films, or of extruded films, by a method which brings about lasting and adequately high adhesion between the individual layers, for example by means of an additional application of adhesive (adhesive lamination) or true lamination through application of pressure and heat.

After the drying process, and, where appropriate, after a further coating process and, where appropriate, after prefinishing, for example through roll cutting, the inventive cast PAR film may, as described above, be further processed in a thermoforming apparatus to give diaphragms.

EXAMPLES

Although complete disclosure of the working of the present invention is provided by the inventive examples 1-13 given, the claimed variations in the process parameters also make it possible to carry out numerous other inventive examples. Examples which are carried out by implementing these variations defined within the Description and within the claims are intended to be regarded as inventive examples and to fall within the scope of protection of this patent application.

Example 1

The production batch size was 600 kg of "U-Polymer 100" polyarylate from UNITIKA, having the formula (I), where $R^1=R^2=R^3=R^4$=hydrogen and $R^5=R^6$=methyl, which were weighed out into 2 062 kg of methylene chloride and dissolved during the course of 3 h at room temperature and a further 3 h at 39° C. with continuous stirring. 300 g of "C.I. Solvent Yellow 93" dye from BAYER were added in the form of powder during stirring of the mixture. The solids content of the lacquer was 22.5%.

The lacquer was used to produce films of thickness 100 µm and width about 110 cm.

Example 2

The production batch size was 600 kg of "U-Polymer 100" polyarylate from UNITIKA, having the formula (I), where $R^1=R^2=R^3=R^4$=hydrogen and $R^5=R^6$=methyl, which were weighed out into 2 062 kg of methylene chloride and dissolved during the course of 3 h at room temperature and a further 3 h at 39° C. with continuous stirring. 300 g of "Macrolex® Orange R" dye from BAYER were added in the form of powder during stirring of the mixture. The solids content of the lacquer was 22.5%.

The lacquer was used to produce films of thickness 100 µm and width about 110 cm.

Example 3

The production batch size was 300 kg of "U-Polymer 100" polyarylate from UNITIKA, having the formula (I), where $R^1=R^2=R^3=R^4$=hydrogen and $R^5=R^6$=methyl, which were weighed out into 1 100 kg of methylene chloride and dissolved during the course of 3 h at room temperature and a further 3 h at 39° C. with continuous stirring. 32 g of "C.I. Solvent Yellow 93" dye from BAYER were added in the form of powder during stirring of the mixture. The solids content of the lacquer was 21.5%.

The lacquer was used to produce films of thickness 20, 25, 30, 40, 60, 80, and 100 µm, and width of from about 110 to 120 cm.

Example 4

For products cast by a manual process, from 0.3 to 2.0 kg of lacquers with from 15 to 24% polymer content were prepared by dissolving "U-Polymer 100" PAR from UNITIKA, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.01% content of "C.I. Solvent Yellow 93" dye. The lacquers were used to produce products cast by a manual process in DIN A4 format, the film thickness being from 15 to 100 µm.

Example 5

For products cast by a manual process, from 0.3 to 2.0 kg of lacquers with from 15 to 24% polymer content were prepared by dissolving "U-Polymer 100" PAR from UNITIKA, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.01% content of "Macrolex® Orange R" dye.

The lacquers were used to produce products cast by a manual process in DIN A4 format, the film thickness being from 15 to 100 µm.

Example 6

For products cast by a manual process, from 0.3 to 2.0 kg of lacquers with from 15 to 24% polymer content were prepared by dissolving "U-Polymer 100" PAR from UNITIKA, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.01% content of "Pluronic® PE 6800" surfactant. The lacquers were used to produce products cast by a manual process in DIN A4 format, the film thickness being from 15 to 100 µm.

Example 7

For products cast by a manual process, from 0.3 to 2.0 kg of lacquers with from 15 to 24% polymer content were prepared by dissolving "U-Polymer 100" PAR from UNITIKA, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.001% content of "C.I. Solvent Yellow 93" dye. The lacquers were used to produce products cast by a manual process in DIN A4 format, the film thickness being from 15 to 100 µm.

Example 8

For products cast by a manual process, from 0.3 to 2.0 kg of lacquers with from 15 to 24% polymer content were prepared by dissolving "U-Polymer 100" PAR from UNITIKA, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.001% content of "Macrolex® Orange R" dye.

The lacquers were used to produce products cast by a manual process in DIN A4 format, the film thickness being from 15 to 100 µm.

Example 9

For products cast by a manual process, from 0.3 to 2.0 kg of lacquers with from 15 to 24% polymer content were prepared by dissolving "U-Polymer 100" PAR from Unitika, having the formula (I), where $R^1=R^2=R^3=R^4$=hydrogen and $R^5=R^6$=methyl, in methylene chloride over the course of 3 h at room temperature and a further 3 h at 39° C. with continuous stirring. The lacquers for products cast by a manual process comprised 0.001% content of "Pluronic® PE 6800" surfactant. The lacquers were used to produce products cast by a manual process in DIN A4 format, the film thickness being from 15 to 100 μm.

Comparative Example 10

For products cast by a manual process, from 0.3 to 2.0 kg of lacquers with from 15 to 24% polymer content were prepared by dissolving "U-Polymer 100" PAR from Unitika, having the formula (I), where $R^1=R^2=R^3=R^4$=hydrogen and $R^5=R^6$=methyl, in methylene chloride over the course of 3 h at room temperature and a further 3 h at 39° C. with continuous stirring. No dye and/or surfactant content was present in the lacquers for products cast by a manual process. The lacquers were used to produce products cast by a manual process in DIN A4 format, the film thickness being from 15 to 100 μm.

Example 11

The thixotropic behavior of lacquer specimens from the lacquers from examples 1 to 9, and also from comparative example 10, was observed at particular times after preparation of the ready-to-use solutions. For this, specimens of each of the lacquers were transferred into 5 different vessels. After 30 min, 4 h, 8 h, 20 h, and after from 1 to 4 weeks, films were produced, where possible, by a manual casting process. The observations are given in table 1.

TABLE 1

| Lacquer | after 30 min | after 4 h | after 8 h | after 20 h | after 4 weeks |
| --- | --- | --- | --- | --- | --- |
| Example 1 | useful stable solution with no thickening | useful stable solution with no thickening | useful stable solution with no thickening | useful stable solution with no thickening | useful stable solution with no thickening |
| Example 2 | useful stable solution with no thickening | useful stable solution with no thickening | useful stable solution with no thickening | useful stable solution with no thickening | useful stable solution with no thickening |
| Example 3 | useful stable solution with no thickening | useful stable solution with no thickening | useful stable solution with no thickening | useful stable solution with no thickening | useful stable solution with no thickening |
| Examples 4-6 | useful stable solutions with no thickening | useful stable solution with no thickening | useful stable solutions with no thickening | useful stable solutions with no thickening | useful stable solutions with no thickening |
| Examples 7-9 | useful stable solutions with no thickening | useful stable solution with no thickening | useful stable solutions with no thickening | useful stable solutions with no thickening | useful stable solutions with no thickening |
| Comparative example 10 | incipient thickening | sharp viscosity rise | solution is gel-like and has become unusable | solid gel, no residual motion discernible on inversion | solid gel, no residual motion discernible on inversion |

Example 12

Tensile stress at break and maximum tensile stress were in each case evaluated for 40 film specimens of thickness 30 μm composed of 3 different materials (PC-B, PAR, PC-A) using the Weibull method.

The characteristic Weibull statistical parameters are summarised in table 2. The specimen termed PAR represents an inventive cast PAR film. PC-A and PC-B represent specimens of cast polycarbonate films. PC-A is the current standard polycarbonate for loudspeaker diaphragms made of cast PC films. PC-B is composed of a comparative PC material which was tested as alternative to PC-A.

TABLE 2

| | | Tensile stress at break | | | | Maximum tensile stress | | | |
| --- | --- | --- | --- | --- | --- | --- | --- | --- | --- |
| Polymer | N | $\overline{\sigma} \pm \Delta\sigma$ [MPa] | $\sigma_{c,0}$ [MPa] | $\sigma_m$ [MPa] | m | $\overline{\sigma} \pm \Delta\alpha$ [MPa] | $\sigma_{c,0}$ | $\sigma_m$ [MPa] | m |
| PC-B | 40 | 24.9 ± 5.8 | 27.3 | 25.2 | 4.6 | 73.5 ± 3.5 | 75.1 | 74.0 | 24.9 |
| PAR | 40 | 30.9 ± 5.7 | 33.3 | 31.3 | 6.0 | 77.3 ± 3.4 | 78.8 | 77.8 | 28.3 |
| PC-A | 40 | 42.9 ± 8.7 | 46.6 | 43.5 | 5.3 | 85.1 ± 6.1 | 87.8 | 85.9 | 16.8 |

N: Number of specimens
$\overline{\sigma} \pm \Delta\sigma$: Arithmetic average with standard deviation
$\sigma_{c,0}$: Characteristic strength (probability of break 63.2%)
$\sigma_m$: Median strength (probability of break 50%)
m: Weibull modulus The Weibull moduli m, which characterize the homogeneity of the materials, have the following order for the maximum tensile stress and the tensile stress at break, rising m indicating increasing homogeneity and less scatter of measured values.

Maximum tensile stress: $m(PC-A) < m(PC-B) < m(PAR)$

Tensile stress at break: $m(PC-B) < m(PC-A) < m(PAR)$

When compared with two different cast PC films, the inventive cast PAR film has the lowest inhomogeneity values and, together with this, also the narrowest distribution of measured values.

Example 13

Lifetime test comparison of standard and high-performance types of loudspeaker composed of cast PAR film and cast PC film (PC-A and PC-B, see example 12), based on DIN ETS 300019 "Geräte-Entwicklung; Umweltbedingungen und Umweltprüfungen für Telekommunikationsanlagen" [Equipment development; environmental conditions and environmental tests for telecommunications equipment]. PAR represents the inventive cast PAR film. 5 different loudspeaker types were tested, in each case using at least 50 loudspeakers per type and diaphragm diameter. The loudspeakers were subjected to various tests, such as repeated passage through temperature cycles (from −40 to 85° C.) at high humidity, or prolonged exposure to 85° C. Each loudspeaker was tested for the total period of 500 h under an electrical load, using "pink noise" at the respective power rating given in the data sheet for the respective loudspeaker. The results given are restricted to qualitative assessments, because the failures occur at varying times within the test. Table 5 gives the assessments and states whether the number of loudspeakers tested differs significantly from the number of loudspeakers remaining functional after the test. Loudspeaker diaphragms made of the inventive cast PAR film come out of the lifetime test at least as well as the current standard material.

TABLE 3

| Example | Diaphragm diameter | Film thickness | Number of types | PC-B | PC-A | PAR |
|---|---|---|---|---|---|---|
| 13-1 | 13 mm | 30 μm | 4 | − | + | + |
| 13-2 | 16 mm | 40-60 μm | 3 | − | + | + |
| 13-3 | 13 mm | 30-60 μm | 8 | − | + | + |
| 13-4 | 23-38 mm | 40-150 μm | 24 | + | (+) | (+) |
| 13-5 | 28 mm | 100 μm | 1 | − | (+) | + |

+ = Lifetime test passed with minimal losses,
(+) = lifetime test passed with reservations, with losses remaining acceptable,
− = lifetime test not passed because of high losses

What is claimed is:

1. A thermoformed diaphragm made of cast of polyarylate film, at least comprising one polyarylate having a structural unit of the formula:

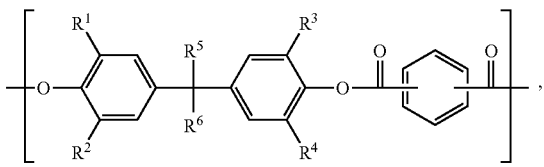

(1)

wherein each of $R^1$, $R^2$, $R^3$, and $R^4$, independently of the others, is hydrogen, $C_{1-4}$-alkyl, $C_{1-4}$-alkoxy, or halogen, and each of $R^5$ and $R^6$, independently of the other, is hydrogen, $C_{1-4}$-alkyl, $C_{1-4}$-alkoxy, phenyl, or halogen, where the cast polyarylate films are produced from polyarylate cast solutions which contain:

(i) a nonionic polyol surfactant selected from the group consisting of poly(ethylene glycol), poly(propylene glycol) and poly(tetramethylene oxide), utilized as homopolymer, copolymer, block polymer, or a mixture thereof, dissolved as a mixture with a dye, or (ii) said nonionic polyol surfactant, each of (i) and (ii) can comprise other additives.

2. The thermoformed diaphragm as claimed in claim 1, wherein $R^1 = R^2$ and $R^3 = R^4$, and each, independently of the others, is hydrogen or $C_{1-4}$-alkyl.

3. The thermoformed diaphragm as claimed in claim 2, wherein $R^1 = R^2 = R^3 = R^4$ and are each hydrogen or $C_{1-4}$-alkyl.

4. The thermoformed diaphragm as claimed in claim 1, wherein each of $R^5$ and $R^6$, independently of the other, is $C_{1-4}$-alkyl.

5. The thermoformed diaphragm as claimed in claim 4 has a thickness of from 5 to 200 μm.

6. The thermoformed diaphragm as claimed in claim 4, wherein each of $R^5$ and $R^6$ is methyl.

7. The thermoformed diaphragm as claimed in claim 3, wherein each of $R^5$ and $R^6$, independently of the other, is $C_{1-4}$-alkyl.

8. The thermoformed diaphragm as claimed in claim 5 has a thickness of 5 to 100 μm.

9. The thermoformed diaphragm as claimed in claim 1 has a thickness of from 5 to 200 μm.

10. The thermoformed diaphragm as claimed in claim 1, wherein $R^1$ $R^2$, $R^3$ and $R^4$ are each hydrogen and $R^5$ and $R^6$ are each methyl.

11. The thermoformed diaphragm as claimed in claim 1, wherein the dye is a dye from the group consisting of "C.I. Solvent Yellow 93", "C.I. Solvent Yellow 16" and "C.I. Solvent Orange 107".

12. A process comprising utilizing the thermoformed diaphragms as claimed in claim 5 as diaphragms for acoustic transducers for acoustic applications.

13. The process as claimed in claim 12 in microphone capsules, mobile telephones, hands-free systems, radio sets, hearing devices, headphones, microradios, computers, PDAs, and/or signal generators.

14. The process as claimed in claim 12, wherein the thermoformed diaphragms are utilized as microphone diaphragms and/or loudspeaker diaphragms.

15. The process comprising utilizing the thermoformed diaphragms as claimed in claim 1 as diaphragms for acoustic transducers for acoustic applications.

* * * * *